Figure 1:
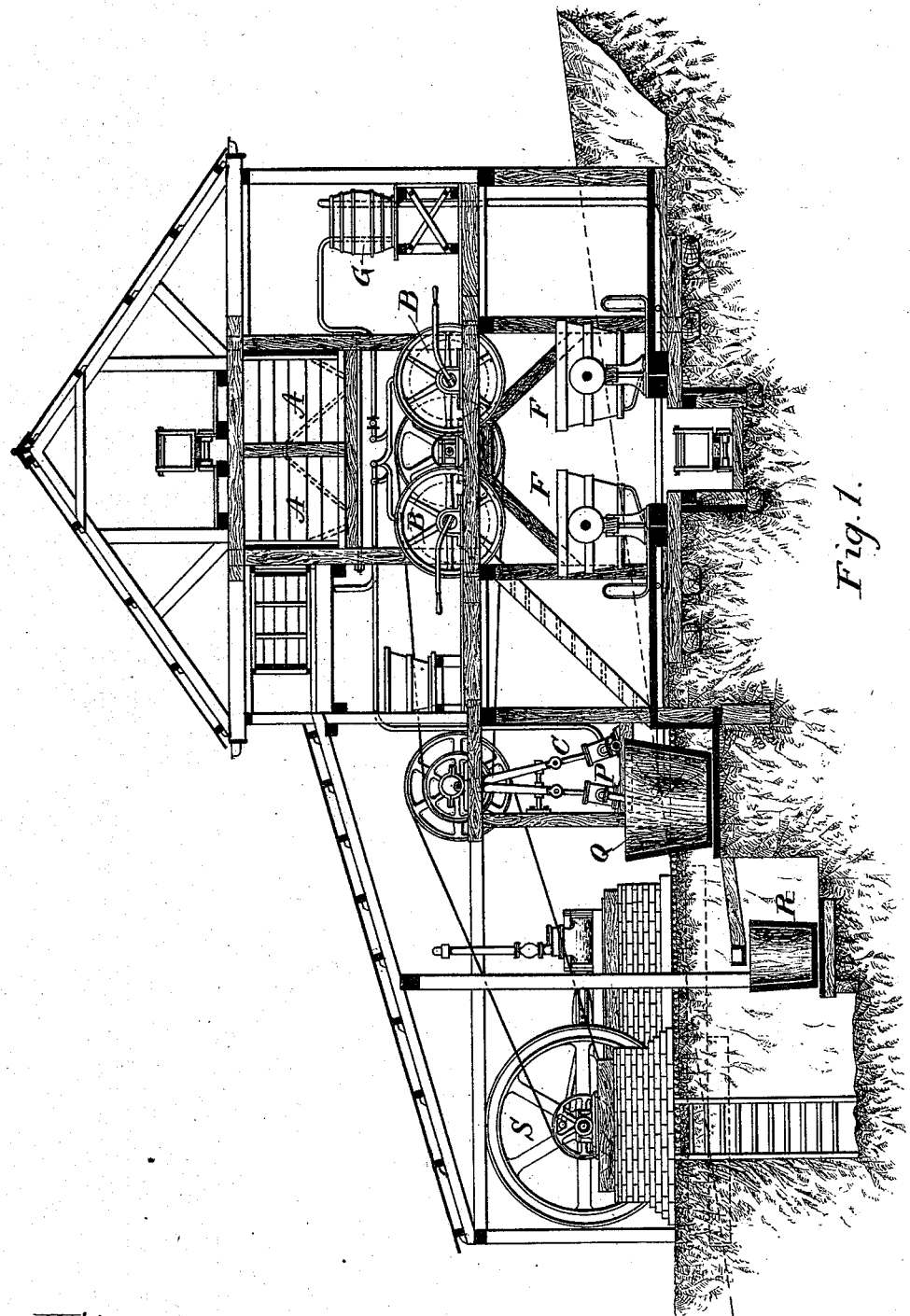

(No Model.) 2 Sheets—Sheet 1.
C. T. J. VAUTIN.
APPARATUS FOR THE EXTRACTION OF GOLD BY CHLORINATION.

No. 413,768. Patented Oct. 29, 1889.

Witnesses
Lloyd B. Wight.
David R. Gourick

Inventor
CLAUDE THEODORE JAMES VAUTIN.
By his Attorney (No Model.) 2 Sheets—Sheet 2.
C. T. J. VAUTIN.
APPARATUS FOR THE EXTRACTION OF GOLD BY CHLORINATION.
No. 413,768. Patented Oct. 29, 1889.
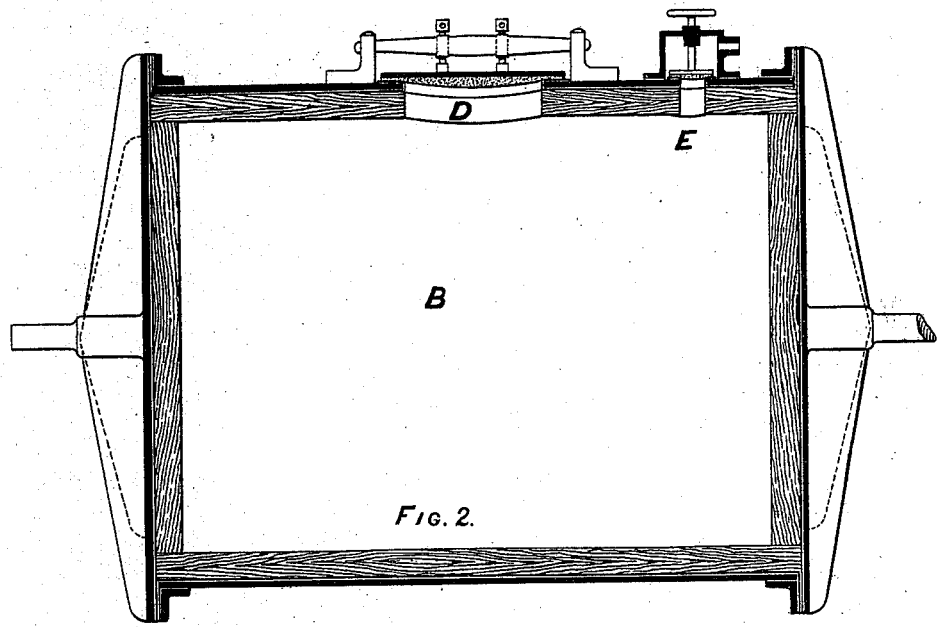
FIG. 2.
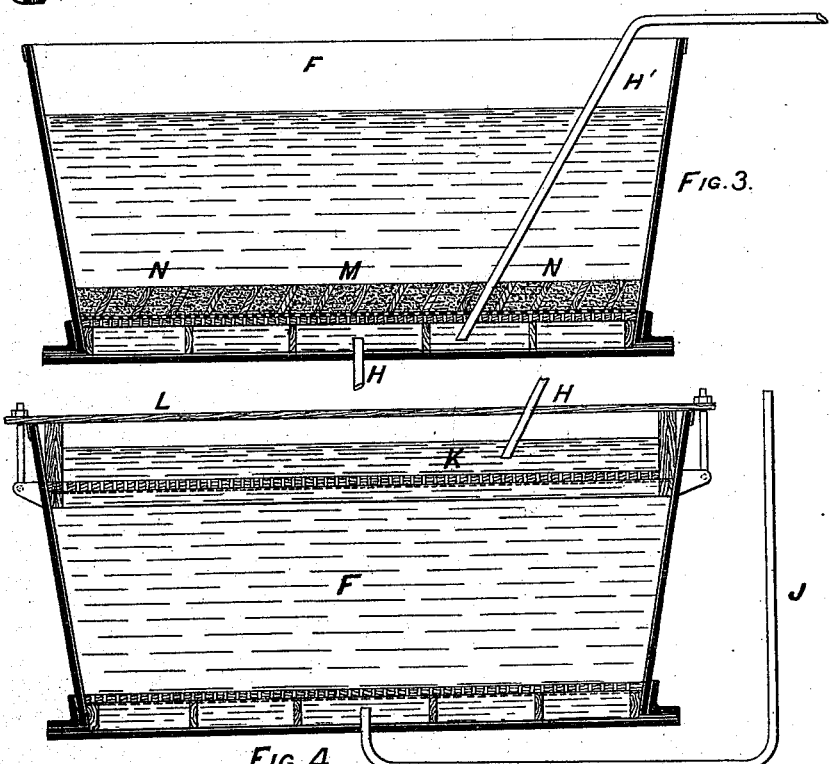
FIG. 3.
FIG. 4.
Witnesses
Lloyd B. Wright
David A. Gourick
Inventor
CLAUDE THEODORE JAMES VAUTIN.
By his Attorney

UNITED STATES PATENT OFFICE.

CLAUDE THEODORE JAMES VAUTIN, OF LONDON, ENGLAND.

APPARATUS FOR THE EXTRACTION OF GOLD BY CHLORINATION.

SPECIFICATION forming part of Letters Patent No. 413,768, dated October 29, 1889.

Application filed November 30, 1887. Serial No. 256,578. (No model.)

*To all whom it may concern:*

Be it known that I, CLAUDE THEODORE JAMES VAUTIN, a subject of Her Majesty the Queen of Great Britain and Ireland, residing at London, England, have invented an Improved Apparatus for the Extraction of Gold from Crushed or other Finely-Divided Auriferous material, of which the following is a specification.

My invention consists of improvements in the apparatus forming the plant employed for the extraction of gold by what is known as the "wet" or hydro-metallurgical process from crushed or other finely-divided auriferous material.

The first step of the process employed consists of treating the pulverized auriferous material with chlorine or other equivalent reagent in the form of gas or in solution with the aid of air-pressure. This I carry out by means of an air force-pump and a closed chamber, which closed chamber is caused to agitate the contents under treatment by rotation from some suitable source of motion. The chamber is provided with a suitable hermetically-closing door, and is connected to the said air force-pump and is, as aforesaid, capable of rotation, so that after the auriferous material has been subjected for a sufficient time to the action of the chlorine or other reagent the said chamber may be inverted and the charge delivered into a filtering-vessel conveniently placed beneath it. The auriferous solution, mixed with the pulverized material, is now passed into this filtering or leaching vessel, and the solution is drawn through the filtering medium by means of suction produced by a suction-pump which is so constructed as to produce in every stroke a partial reflux through the filtering medium of the withdrawn liquid charge, so as to keep the filtering medium cleansed and free from choking, as in my application for a patent to me under even date herewith, Serial No. 256,579. From the said suction-pump the auriferous solution is discharged into a suitable vat, through which also air or steam is passed. From this point the auriferous solution is passed through a filter of charcoal or other suitable reagent, consisting of successive beds of alternately rough and fine pieces of charcoal or other reagent arranged in vertical beds or columns of considerable height. The auriferous solution is here rapidly decomposed and deposits its gold upon the charcoal or other reagent, from which it is obtained in any convenient manner.

In order that my invention may be the better understood, I now proceed to describe the nature of the apparatus in connection with the drawings hereunto annexed, reference being had to the letters and figures marked thereon.

Figure 1 is a general elevation of my apparatus forming the plant employed for the extraction of gold. Fig. 2 is a sectional detail of the closed chamber in which the gold is acted on by any suitable reagent, such as chlorine. Fig. 3 is a sectional detail through the filtering-vessel or leaching-vessel when the flow is downward. Fig. 4 is a modified detail of my filtering-vessel with cover when the flow is reversed or taken upward.

A A, Fig. 1, are the hoppers, from which the pulverized ore is discharged for treatment in the closed vessels B B by chlorine, bromine, or other equivalent reagent, in a liquid or gaseous condition, which is applied under pressure, and which is caused to react on the ore under a pressure greater than that of the atmosphere by means of an air force-pump C, in which the suction-valve opens inward from the atmosphere, and the delivery-valve opens into a pipe leading therefrom through branches to the respective vessels B, as shown in Fig. 1. Each vessel B, as shown in detail, Fig. 2, is strongly constructed of iron or similar suitable material to carry considerable internal pressure. It is hermetically closed by a peripheral man-hole door D, by which the charge of ore is admitted when required and discharged when sufficiently treated. I have found it important to effect the lining of this chamber in the following manner: Within the iron shell I apply a coating of lead, to protect the former against the action of the chemical reagents or salts, and within that I apply another protective coating of wood, earthenware, or suitable material, to prevent the abrasion of the lead lining by the agitation of the ore therein by rotation. The gas or air communications I effect through a suitable stop-valve E, to which the pipes are detachably connected by a suitable union. By this means, after the admixture of the pulverized ore and the chlorine or other chemical reagent has been made in this chamber, compressed air is admitted from the air-compressor C until the required working-pressure of about five atmospheres per square inch is arrived at. The valve E is then screwed down and the pipes detached, while agitation of the contents by the rotation of the vessel proceeds. Before discharge of the contents into the filtering-vessel or leaching-tub F F the compressed air and gas is allowed to pass through this valve E by a suitable connection into a solution of lime-water in the tub G to absorb noxious vapors. The ore so treated is then discharged by inversion of the chamber B into the leaching-tubs or filters F F. (Shown in alternative detail in Figs. 3 and 4.) The leaching or separating of the auriferous solution from the pulverized material therewith mixed is effected by the direct suction of a pump P through the alternative suction-pipes H H', Fig. 3, a flow of water being maintained as long as required. In the apparatus as shown in Fig. 3 this operation is carried out by filtration downward. In Fig. 4 the inverse process is used, the solution being withdrawn upward through the filtering medium K, consisting of a perforated wooden diaphragm covered with a suitable filtering medium—such as canvas or asbestus—a flow of water being maintained through the supply-pipe J, Fig. 4. In this case the filtering-vessel or leaching-tub is conveniently closed by a cover L, bolted down upon the open mouth of the vessel. The pulverized material and the filtering medium are prevented from choking by a reflux action from the suction-pump P through the suction-pipe H or H', particularly as described in the said application for a patent made by me under even date herewith, Serial No. 256,579. After sufficient leaching of the ore or pulverized material has been effected in this leaching-vessel the solid material is conveniently discharged by reversal of the filtering-vessel and taken away by a trolley or other convenient means.

To prevent the filter-bed M, as shown in Fig. 3, from being discharged by reversal of the filter, I provide a series of obliquely-inclined wooden slats interspersed between the filtering medium to keep it in place even during reversal of the said filter-vessel. The auriferous solution so withdrawn from the filtering-vessel is delivered into the vat Q, where it is treated with a jet of steam or air to drive off any free chlorine or uncombined reagent that may remain in the solution. The solution is then passed through a filter R, composed of charcoal or other reagent, which is formed of alternate layers of coarse and fine pieces, respectively, and is of considerable height and small sectional area. The gold is here precipitated from its solution, and is recovered from the material of the said filter by burning or other suitable chemical process.

The moving portions of my apparatus are conveniently driven by a steam-engine S or other convenient motor.

The distinct combination of the reflux suction-pump P with the filtering-vessels or leaching-tubs F F is claimed in my companion specification, forming part of said application Serial No. 256,579, and forms no part of my present invention.

The process or method carried into effect by my apparatus may be "the Newbery-Vautin method," which is the joint invention of James Cosmo Newbery and myself, as set forth in our joint application for United States patent Serial No. 237,146, (Patent No. 380,920,) or any other method of treating finely-divided auriferous materials in which the said apparatus can be advantageously employed.

Having now particularly described and ascertained the nature of my said invention and in what manner the same is to be performed, I declare that what I claim is—

1. A hydro-metallurgical gold-extracting apparatus comprising an air-forcing pump in which the suction-valve opens inward from the atmosphere, a pipe into which the delivery-valve of such pump opens, a hermetically-closed vessel in the form of a rotary drum, having an inlet-valve to which said pipe is detachably coupled, and a peripheral man-hole door, a filtering-vessel arranged to receive the discharge of said drum through its man-hole when the drum is opened and inverted, a reflux suction-pump which withdraws the liquid contents of the filtering-vessel, an air or steam agitated vat into which said suction-pump discharges, a deep filter-bed of charcoal which receives the discharge of said vat, and a motor and connections for rotating said drum and operating the pumps, substantially as hereinbefore specified.

2. In such a hydro-metallurgical gold-extracting apparatus, the combination of an air-forcing pump in which the suction-valve opens inward from the atmosphere, a pipe into which the delivery-valve of this pump opens, a hermetically-closed vessel in the form of a rotary drum constructed to work with considerable internal pressure, and provided with an inlet-valve to which said pipe is detachably coupled, and a peripheral man-hole door and means for rotating said drum and operating said pump, substantially as hereinbefore specified.

3. In such a hydro-metallurgical gold-extracting apparatus, the combination of a hermetically-closed vessel in the form of a rotary drum having a peripheral man-hole door, a filtering-vessel arranged to receive the discharge of said drum through its man-hole when the drum is opened and inverted, a reflux suction-pump which withdraws the liquid contents of the filtering-vessel, an air or steam agitated vat into which said suction-pump discharges, and a deep filter-bed of charcoal
5 which receives the discharge of said vat, substantially as hereinbefore specified.

In testimony whereof I have signed my name to this specification in the presence of two subscribing witnesses.

CLAUDE THEODORE JAMES VAUTIN.

Witnesses:
 WILLIAM BOHM,
 SAMUEL P. WILDING.